United States Patent
Kuwata et al.

(10) Patent No.: US 11,522,213 B2
(45) Date of Patent: Dec. 6, 2022

(54) COATING MATERIAL FOR CATHODE ACTIVE MATERIAL IN LITHIUM BATTERIES

(71) Applicants: Nissan North America, Inc., Franklin, TN (US); United States of America as Represented by the Administrator of NASA, Washington, DC (US)

(72) Inventors: Shigemasa Kuwata, Palo Alto, CA (US); Hideyuki Komatsu, Yokosuka (JP); Maarten Sierhuis, San Francisco, CA (US); Balachandran Gadaguntla Radhakrishnan, San Mateo, CA (US); Shreyas Honrao, Sunnyvale, CA (US); John Lawson, San Francisco, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 152 days.

(21) Appl. No.: 17/170,040

(22) Filed: Feb. 8, 2021

(65) Prior Publication Data

US 2022/0255119 A1 Aug. 11, 2022

(51) Int. Cl.
*H01M 4/00* (2006.01)
*H01M 10/0525* (2010.01)
(Continued)

(52) U.S. Cl.
CPC ....... *H01M 10/0525* (2013.01); *H01M 4/366* (2013.01); *H01M 4/505* (2013.01);
(Continued)

(58) Field of Classification Search
CPC ......... H01M 10/0525; H01M 10/0562; H01M 4/505; H01M 4/525; H01M 4/58; H01M 4/36
See application file for complete search history.

(56) References Cited

U.S. PATENT DOCUMENTS

| | | | | |
|---|---|---|---|---|
| 6,165,644 A | * | 12/2000 | Nimon | H01M 4/5815 429/231.95 |
| 2014/0205884 A1 | * | 7/2014 | Wohrle | H01M 50/434 429/145 |

OTHER PUBLICATIONS

Chen, H., Wong, L.L. and Adams, S. (2019), SoftBV—a software tool for screening the materials genome of inorganic fast ion conductors. Acta Cryst. B, 75: 18-33.

* cited by examiner

*Primary Examiner* — Cynthia H Kelly
*Assistant Examiner* — Monique M Wills
(74) *Attorney, Agent, or Firm* — Young Basile Hanlon & MacFarlane, P.C.

(57) ABSTRACT

A lithium battery comprises cathode active material comprising particles of a transition metal oxide, each particle coated in an ion-conducting material that has an electrochemical stability window against lithium of at least 2.2 V, a lowest electrochemical stability being less than 2.0 V and a highest electrochemical stability being greater than 4.2 V, the ion-conducting material selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$;

(Continued)

$Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

16 Claims, 1 Drawing Sheet

(51) Int. Cl.
  *H01M 10/0562* (2010.01)
  *H01M 4/505* (2010.01)
  *H01M 4/58* (2010.01)
  *H01M 4/36* (2006.01)
  *H01M 4/525* (2010.01)
(52) U.S. Cl.
  CPC .......... *H01M 4/525* (2013.01); *H01M 4/582* (2013.01); *H01M 10/0562* (2013.01); *H01M 2300/0065* (2013.01)

COATING MATERIAL FOR CATHODE ACTIVE MATERIAL IN LITHIUM BATTERIES

TECHNICAL FIELD

This disclosure relates to lithium batteries having cathode active material coated in one or more materials possessing high ionic conductivity and stability against lithium.

BACKGROUND

Advances have been made toward high energy density batteries, using lithium metal as the anode material, including both lithium ion batteries and all-solid-state batteries (ASSBs). Discovery of new materials and the relationship between their structure, composition, properties, and performance have advanced the field. However, even with these advances, batteries remain limited by the underlying choice of materials and electrochemistry. Among the components in both lithium ion and ASSBs, the cathode active material may limit the energy density and dominate the battery cost.

SUMMARY

Disclosed herein are implementations of a cathode material for a lithium battery and lithium-ion batteries and ASSBs including the cathode material.

One embodiment of a lithium battery comprises an anode comprising lithium, an electrolyte, and a cathode comprising cathode active material. The cathode active material comprises particles of a transition metal oxide, each particle coated in an ion-conducting material that has an electrochemical stability window against lithium of at least 2.2 V, a lowest electrochemical stability being less than 2.0 V and a highest electrochemical stability being greater than 4.2 V, the ion-conducting material selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_{16}$; $Rb_2LiYCl_6$; $RbLi_2Be_2F_7$; $RbLiCl_2$; and $RbLiF_2$.

Another embodiment of a lithium battery as disclosed herein is an all-solid-state battery comprising a lithium-metal based anode, a solid electrolyte, and a cathode comprising a transition metal oxide active material coated in an ion-conducting material that has an electrochemical stability window against lithium of at least 2.2 V, a lowest electrochemical stability being less than 2.0 V and a highest electrochemical stability being greater than 4.2 V, the ion-conducting material selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

An embodiment of a cathode for a lithium battery comprises active cathode material particles and a coating on the active cathode material particles. The coating comprises an ion-conducting material, the ion-conducting material having an electrochemical stability window against lithium of at least 2.2 V, a lowest electrochemical stability being less than 2.0 V and a highest electrochemical stability being greater than 4.2 V, the ion-conducting material comprising one or more of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

In any of the embodiments herein, the electrochemical stability window against lithium of the ion-conducting material can be at least 2.8 V and the highest electrochemical stability is greater than 4.8 V, the ion-conducting material selected from the group consisting of: $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$; $Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $RbLi_2Be2F_7$; and $RbLiF_2$.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A battery's voltage and capacity, and thus the battery's output, can be optimized by, at least in part, increasing the potential difference between the anode and cathode, reducing the mass and volume of active material necessary, and reducing consumption of the electrolyte by reducing oxidation or reduction reactions.

For lithium batteries, electrode materials are those that reversibly insert ions through ion-conductive, crystalline materials. Conventional cathode active material consists of a transition metal oxide, which undergoes low-volume expansion and contraction during lithiation and delithiation. The anode active material can be lithium metal, the low density of lithium metal producing a much higher specific capacity than traditional graphite anode active material.

To improve battery performance, one area of focus is on identifying higher-capacity cathode materials with increased lithium ion conductivity, reversibly exchanging lithium ions quickly at higher potentials.

Disclosed herein are cathodes comprising cathode active material coated with an ion-conducting material selected based on the following material characteristics: ionic migration; a wide electrochemical stability window against lithium; stability against lithium metal; and inertness to environmental elements like water and air. Rather than focusing on alternative cathode active materials themselves, the cathode coating materials herein focus on improving the performance of cathode active materials in lithium batteries using lithium metal anodes, and in particular transition metal oxide-based cathode active materials.

Figure 1:
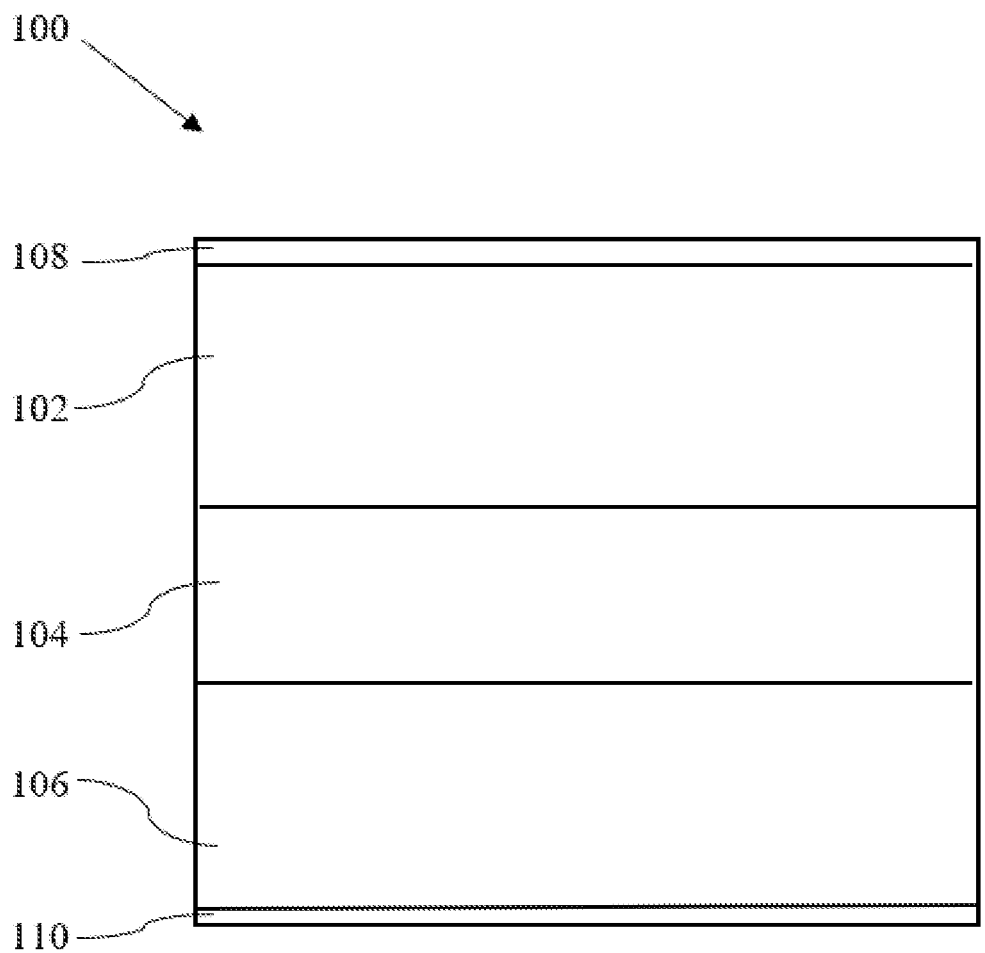
FIG. 1 is a cross-section schematic view of a lithium battery cell as disclosed herein.

A lithium battery cell 100 is illustrated schematically in cross-section in FIG. 1. The lithium battery cell 100 of FIG. 1 is configured as a layered battery cell that includes as active layers a cathode active material layer 102 as described herein, an electrolyte 104, and an anode active material layer 106. In some embodiments, such as lithium batteries using a liquid or gel electrolyte, the lithium battery cell 100 may include a separator interposed between the cathode composite layer 102 and the anode active material layer 106. In addition to the active layers, the lithium battery cell 100 of FIG. 1 may include a cathode current collector 108 and an anode current collector 110, configured such that the active layers are interposed between the anode current collector 110 and the cathode current collector 108. In such a configuration, the cathode current collector 108 is adjacent to the cathode composite layer 102, and the anode current collector 110 is adjacent to the anode active material layer 106. A lithium battery can be comprised of multiple lithium battery cells 100.

The anode active material in the anode active material layer 106 can be a layer of elemental lithium metal, a layer of a lithium compound(s) or a layer of doped lithium. The anode current collector 110 can be, as a non-limiting example, a sheet or foil of copper, nickel, a copper-nickel alloy, carbon paper, or graphene paper.

In lithium ion batteries, the electrolyte 104 may include a liquid electrolyte, a polymer ionic liquid, a gel electrolyte, or a combination thereof. The electrolyte can be an ionic liquid-based electrolyte mixed with a lithium salt. The ionic liquid may be, for example, at least one selected from N-Propyl-N-methylpyrrolidinium bis(flurosulfonyl)imide, N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide. The salt can be or include, for example, a fluorosulfonyl (FSO) group, e.g., lithium bisfluorosulfonylimide ($LiN(FSO_2)_2$, (LiFSI), $LiN(FSO_2)_2$, $LiN(FSO_2)(CF_3SO_2)$, $LiN(FSO_2)(C_2F_5SO_2)$. In some embodiments, the electrolyte is or includes a cyclic carbonate (e.g., ethylene carbonate (EC) or propylene carbonate, a cyclic ether such as tetrahydrofuran (THF) or tetrahydropyran (TH), a glyme such as dimethoxyethane (DME) or diethoxyethane, an ether such as diethylether (DEE) or methylbutylether (MBE), their derivatives, and any combinations and mixtures thereof. Where a separator is used, such as with a liquid or gel electrolyte, the separator can be a polyolefine or a polyethylene, as non-limiting examples.

In ASSBs, the electrolyte 104 is solid. The solid electrolyte can be, as non-limiting examples, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

The cathode current collector 108 can be, as a non-limiting example, an aluminum sheet or foil, carbon paper or graphene paper.

The cathode active material layer 102 has cathode active material coated with one or more of the ion-conducting materials disclosed herein. The cathode active material can include one or more lithium transition metal oxides and lithium transition metal phosphates which can be bonded together using binders and optionally conductive fillers such as carbon black. Lithium transition metal oxides and lithium transition metal phosphates can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$.

Figure 2:
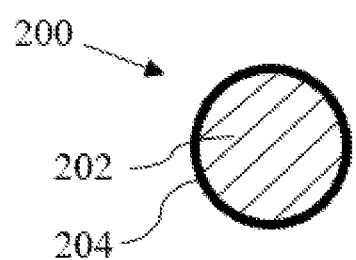
FIG. 2 is a cross-section schematic view of a coated cathode active material particle.

The cathode active material layer 102 comprises coated active material particles 200 as depicted schematically in FIG. 2. The coated cathode active material particles 200 are particles of cathode active material 202 coated in one or more ion-conducting material 204. The ion-conducting material is selected from the group consisting of: $BaLi(B_3O_5)_3$; $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi(B_3O_5)_2$; $CsLi_2Cl_3$; $CsLi_3Cl_4$; $CsLiBeF_4$; $CsLiCl_2$; $CsLiSO_4$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2H_2SO_5$; $Li_2MgCl_4$; $Li_2SiF_6$; $Li_2SO_4$; $Li_2Ta_2(OF_2)_3$; $Li_2ZnCl_4$; $Li_2ZrF_6$; $Li_3AlF_6$; $Li_3ErCl_6$; $Li_3PO_4$; $Li_3Sc_2(PO_4)_3$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiAsO_4$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; $RbLiF_2$; and $SrLi(B_3O_5)_3$.

The group of ion-conducting material meet the following criteria. Each has an electrochemical stability window against lithium of 2.2 V or wider, with a lowest electrochemical stability being less than 2.0 V and a highest electrochemical stability being greater than 4.2 V. Each is stable with lithium. Each has an estimated lithium ion migration energy of under 1.0 eV.

In another aspect, the ion-conducting material is selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$. Each has an electrochemical stability window against lithium of 2.2 V or wider, with a lowest electrochemical stability being less than 2.0 V and a highest electrochemical stability being greater than 4.2 V. Each is stable with lithium. Each has an estimated lithium ion migration energy of under 1.0 eV. In addition, each material in this group has a halogen component. It is contemplated that the halogen component enables fast ion shuttling and stable electrode/electrolyte interfaces.

The electrochemical stability window of a material is the voltage range in which it is neither oxidized nor reduced. It is measured by subtracting the reduction potential from the oxidation potential. The grand potential phase diagram approach using the density-functional theory (DFT) was used to calculate the electrochemical stability window of materials against lithium. Lithium grand potential phase diagrams represent phase equilibria that are open to lithium, which is relevant when the material is in contact with a reservoir of lithium. The electrochemical stability window of a material is the voltage range in which no lithiation or delithiation occurs, i.e. where lithium uptake is zero. The ion-conducting materials herein each has an electrochemical stability window against lithium of 2.0 V or wider, with a lowest electrochemical stability being less than 2.0 V and a highest electrochemical stability being greater than 4.2 V. The values of the lowest electrochemical stability (2.0 V) and the highest electrochemical stability (4.2 V) are used to represent the operating range of a typical cathode using a transition metal oxide-based cathode active material.

Ionic conductivity is the property most often used to study ionic migration in solids. The ionic conductivity of a solid measures how easily an ion can move from one site to another through defects in the crystal lattice. While ionic conductivity clearly depends on the crystal structure, it is also influenced by the microstructure that emerges from the processing of the solid. To work with a material property that is independent of processing conditions, lithium ion migration energy, i.e., the lithium ion migration barrier, is used as a measure of the ionic migration of lithium compounds.

The 1D barrier measures the lowest energy required by a diffusion species to hop between two opposite faces of a unit cell, in any one of the three directions. The 2D barrier and 3D barrier, correspondingly, measure the lowest energies required to hop between opposite faces in any two or all three directions, respectively. The 1D barrier≤2D barrier≤3D barrier for all solids. The lowest activation energy required to connect every point on the pathway is the 3D migration barrier, and it can provide a quantitative measure of the maximum achievable ionic conductivity. The 1D, 2D, and 3D migration barriers, in general, depend on the dimensionality of the pathway available for lithium conduction in a material. For isotropic materials, where conduction is equally fast in all three dimensions, the three barriers are similar. In such cases, the 3D barrier turns out to be a good estimate of the expected ionic conductivity. In these cases, the 3D barrier is used as an effective barrier. However, many materials have predominant 2D conduction pathways, or in some cases, predominant 1D conduction pathways. In these materials, the 1D/2D barriers can be significantly smaller than the 3D barrier. To account for such cases, the effective barrier is set as either the 1D barrier or the 2D barrier depending on how different they are in magnitude. The ion-conducting materials herein have a low migration barrier, having an estimated migration barrier, or estimated lithium ion migration energy, of 1.0 eV or less.

Table One includes the lowest electrochemical stability and the highest electrochemical stability of the materials disclosed herein, along with the estimated migration barrier of the materials.

Due to the cost and depleting reserves of cobalt, cathode active materials with diminished mole ratios of cobalt, or no cobalt altogether, have been developed. Nickel-rich NMC cathode active materials often have the formula $LiNi_xM_{1-x}O_2$, where x≥0.6 and M=Mn, Co, and sometimes Al. But cycle stability is a weakness due to the many degradation mechanisms available, including irreversible structural transformation, thermal degradation, and formation of a cathode electrolyte interphase (CEI). Dissolution of manganese-ions in acidic environments occurs. The use of nickel alone, such as in $LiNiO_2$, suffers from severe structural degradation upon lithiation and delithiation. $LiNiO_2$ is reactive to the electrolyte when charged to high voltages (>4 V vs Li) due to the oxidizing power of the $Ni^{4+}$ in the delithiated state.

For at least these reasons, it is contemplated that the cathode active material layer with the ion-conducting material coating performs better than the active material alone. In addition to being excellent lithium ion conductors, it is contemplated that the ion-conducting material impacts the performance of transition metal oxide-based cathode active materials, and in particular those including at least one of nickel, manganese and cobalt, as the ion-conducting materials herein surround the cathode active material, repressing the negative effects that are described above.

When using a transition metal-oxide based cathode active material, and in particular one in which nickel, manganese or cobalt, or a combination of two or more, is used, an ion-conducting material having an electrochemical stability window against lithium of at least 2.8 V, a lowest electrochemical stability being less than 2.0 V and a highest electrochemical stability being greater than 4.8 V, results in further improved lithium battery performance. When the cathode active material layer comprises a transition metal oxide, and in particular a transition metal oxide comprising one or more of nickel, cobalt and manganese, or consisting of one or more of nickel, cobalt and manganese, the ion-conducting material is selected from the group consisting of: $BaLi(B_3O_5)_3$; $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$;

$Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $Rb_2LiAsO_4$; $RbLi_2Be_2F_7$; and $RbLiF_2$. The higher value of the highest electrochemical stability assists to counter the effects on nickel at higher voltages.

In another aspect, when the cathode active material layer comprises a transition metal oxide, and in particular a transition metal oxide comprising one or more of nickel, cobalt and manganese, or consisting of one or more of nickel, cobalt and manganese, the ion-conducting material has a halogen component and is selected from the group consisting of: $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$; $Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $RbLi_2Be_2F_7$; and $RbLiF_2$.

TABLE 1

| Material | Estimated Barrier | Lowest Electrochemical Stability | Highest Electrochemical Stability |
|---|---|---|---|
| $BaLi(B_3O_5)_3$ | 0.268 | 1.269 | 4.813 |
| $Cs_2LiCl_3$ | 0.105 | 0.000 | 4.265 |
| $Cs_2LiCrF_6$ | 0.360 | 1.882 | 4.822 |
| $Cs_2LiDyCl_6$ | 0.849 | 0.510 | 4.289 |
| $Cs_2LiErCl_6$ | 0.890 | 0.413 | 4.585 |
| $Cs_2LiGdCl_6$ | 0.802 | 0.439 | 4.577 |
| $Cs_2LiLuCl_6$ | 0.903 | 0.418 | 4.803 |
| $Cs_2LiNdCl_6$ | 0.938 | 0.592 | 4.273 |
| $Cs_2LiPrCl_6$ | 0.829 | 0.452 | 4.255 |
| $Cs_2LiScCl_6$ | 0.379 | 0.617 | 4.365 |
| $Cs_2LiSmCl_6$ | 0.958 | 0.451 | 4.487 |
| $Cs_2LiTbCl_6$ | 0.748 | 0.414 | 4.579 |
| $Cs_2LiTmCl_6$ | 0.971 | 0.408 | 4.272 |
| $Cs_2LiYCl_6$ | 0.892 | 0.420 | 4.587 |
| $Cs_3Li_2Cl_5$ | 0.189 | 0.000 | 4.265 |
| $Cs_3LiCl_4$ | 0.148 | 0.000 | 4.265 |
| $CsLi(B_3O_5)_2$ | 0.649 | 1.092 | 4.690 |
| $CsLi_2Cl_3$ | 0.254 | 0.000 | 4.265 |
| $CsLi_3Cl_4$ | 0.455 | 0.000 | 4.255 |
| $CsLiBeF_4$ | 0.705 | 0.741 | 6.482 |
| $CsLiCl_2$ | 0.230 | 0.000 | 4.265 |
| $CsLiSO_4$ | 0.923 | 1.543 | 4.789 |
| $K_{10}LiZr_6H_4O_2F_{35}$ | 0.818 | 1.957 | 4.657 |
| $K_2LiCeCl_6$ | 0.424 | 0.582 | 4.255 |
| $K_2LiDyCl_6$ | 0.991 | 0.552 | 4.255 |
| $K_2LiGdCl_6$ | 0.461 | 0.510 | 4.255 |
| $K_2LiLaCl_6$ | 0.390 | 0.356 | 4.255 |
| $K_2LiPrCl_6$ | 0.401 | 0.486 | 4.255 |
| $K_2LiTbCl_6$ | 0.489 | 0.494 | 4.255 |
| $KLiDyF_5$ | 0.433 | 0.287 | 6.150 |
| $KLiErF_5$ | 0.357 | 0.279 | 6.131 |
| $KLiGdF_5$ | 0.363 | 0.388 | 6.155 |
| $KLiHoF_5$ | 0.356 | 0.282 | 6.151 |
| $KLiLuF_5$ | 0.361 | 0.274 | 6.139 |
| $KLiPH_2O_4F$ | 0.661 | 1.942 | 4.458 |
| $KLiTbF_5$ | 0.365 | 0.291 | 6.156 |
| $KLiTmF_5$ | 0.337 | 0.259 | 6.183 |
| $KLiYF_5$ | 0.368 | 0.325 | 6.114 |
| $Li_{10}Mg_7Cl_{24}$ | 0.379 | 0.882 | 4.255 |
| $Li_2B_3O_4F_3$ | 0.120 | 1.877 | 4.461 |
| $Li_2B_6O_9F_2$ | 0.627 | 1.860 | 4.329 |
| $Li_2BeCl_4$ | 0.722 | 1.521 | 4.255 |
| $Li_2BF_5$ | 0.528 | 1.938 | 6.362 |
| $Li_2CaHfF_8$ | 0.450 | 1.013 | 6.683 |
| $Li_2H_2SO_5$ | 0.885 | 1.932 | 4.415 |
| $Li_2MgCl_4$ | 0.341 | 0.882 | 4.255 |
| $Li_2SiF_6$ | 0.464 | 1.835 | 6.678 |
| $Li2SO4$ | 0.251 | 1.574 | 4.667 |
| $Li_2Ta_2(OF_2)_3$ | 0.333 | 1.700 | 4.882 |
| $Li_2ZnCl_4$ | 0.456 | 1.948 | 4.255 |

TABLE 1-continued

| Material | Estimated Barrier | Lowest Electrochemical Stability | Highest Electrochemical Stability |
|---|---|---|---|
| $Li_2ZrF_6$ | 0.507 | 1.240 | 6.557 |
| $Li_3AlF_6$ | 0.175 | 1.058 | 6.478 |
| $Li_3ErCl_6$ | 0.664 | 0.714 | 4.257 |
| $Li_3PO_4$ | 0.376 | 0.689 | 4.210 |
| $Li_3Sc_2(PO_4)_3$ | 0.547 | 1.862 | 4.206 |
| $Li_3ScCl_6$ | 0.037 | 0.907 | 4.255 |
| $Li_3ScF_6$ | 0.161 | 0.603 | 6.361 |
| $Li_3ThF_7$ | 0.338 | 0.697 | 6.361 |
| $Li_3YF_6$ | 0.215 | 0.364 | 6.361 |
| $Li_4Be_3P_3BrO_{12}$ | 0.418 | 1.707 | 4.405 |
| $Li_4Be_3P_3ClO_{12}$ | 0.347 | 1.717 | 4.473 |
| $Li_4ZrF_8$ | 0.427 | 1.209 | 6.377 |
| $Li_6ZrBeF_{12}$ | 0.440 | 1.209 | 6.377 |
| $Li_9Mg_3P_4O_{16}F_3$ | 0.215 | 1.544 | 4.210 |
| $LiAlCl_4$ | 0.390 | 1.590 | 4.453 |
| $LiB_6O_9F$ | 0.293 | 1.933 | 4.805 |
| $LiBF_4$ | 0.123 | 1.938 | 7.108 |
| $LiGdCl_4$ | 0.529 | 0.746 | 4.255 |
| $LiLuF_4$ | 0.692 | 0.289 | 6.687 |
| $LiScF_4$ | 0.771 | 0.603 | 6.362 |
| $LiTaF_6$ | 0.719 | 1.874 | 7.224 |
| $LiThF_5$ | 0.073 | 0.697 | 6.408 |
| $LiYF_4$ | 0.594 | 0.364 | 6.558 |
| $LiZr_5T_1F_{22}$ | 0.823 | 1.947 | 4.868 |
| $Na_3Li_3Al_2F_{12}$ | 0.198 | 0.939 | 6.567 |
| $NaLi_2AlF_6$ | 0.059 | 1.058 | 6.478 |
| $NaLiBeF_4$ | 0.402 | 0.886 | 6.480 |
| $NaLiMgPO_4F$ | 0.417 | 1.507 | 4.229 |
| $Rb_2LiAsO_4$ | 0.345 | 1.259 | 6.571 |
| $Rb_2LiCeCl_6$ | 0.976 | 0.552 | 4.255 |
| $Rb_2LiDyCl_6$ | 0.934 | 0.571 | 4.255 |
| $Rb_2LiErCl_6$ | 0.976 | 0.468 | 4.316 |
| $Rb_2LiGdCl_6$ | 0.885 | 0.484 | 4.255 |
| $Rb_2LiLaCl_6$ | 0.910 | 0.320 | 4.255 |
| $Rb_2LiLuCl_6$ | 0.991 | 0.469 | 4.748 |
| $Rb_2LiPrCl_6$ | 0.904 | 0.453 | 4.255 |
| $Rb_2LiScCl_6$ | 0.993 | 0.686 | 4.628 |
| $Rb_2LiTbCl_6$ | 0.826 | 0.562 | 4.255 |
| $Rb_2LiYCl_6$ | 0.978 | 0.590 | 4.255 |
| $RbLi_2Be_2F_7$ | 0.433 | 0.841 | 6.106 |
| $RbLiCl_2$ | 0.703 | 0.000 | 4.255 |
| $RbLiF_2$ | 0.351 | 0.620 | 5.604 |
| $SrLi(B_3O_5)_3$ | 0.321 | 1.559 | 4.531 |

Unless otherwise defined, all technical and scientific terms used have the same meaning as commonly understood by one of ordinary skill in the art to which the claimed subject matter belongs. The terminology used in this description is for describing particular embodiments only and is not intended to be limiting. As used in the specification and appended claims, the singular forms "a," "an," and "the" are intended to include the plural forms as well, unless the context clearly indicates otherwise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lithium battery, comprising:
   an anode comprising lithium;
   an electrolyte; and
   a cathode comprising cathode active material, the cathode active material comprising particles of a transition metal oxide, each particle coated in an ion-conducting material that has an electrochemical stability window against lithium of at least 2.2 V, a lowest electrochemical stability being less than 2.0 V and a highest electrochemical stability being greater than 4.2 V, the ion-conducting material selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

2. The lithium battery of claim 1, wherein the lithium battery is an all-solid-state battery and the electrolyte is a solid electrolyte.

3. The lithium battery of claim 1, wherein the transition metal oxide comprises one or more of nickel, cobalt and manganese.

4. The lithium battery of claim 1, wherein the electrochemical stability window against lithium of the ion-conducting material is at least 2.8 V and the highest electrochemical stability is greater than 4.8 V, the ion-conducting material selected from the group consisting of: $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$; $Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $RbLi_2Be2F_7$; and $RbLiF_2$.

5. The lithium battery of claim 4, wherein the lithium battery is an all-solid-state battery and the electrolyte is a solid electrolyte.

6. The lithium battery of claim 4, wherein the transition metal oxide comprises one or more of nickel, cobalt and manganese.

7. An all-solid-state battery, comprising:
a lithium-metal based anode;
a solid electrolyte; and
a cathode comprising a transition metal oxide active material coated in an ion-conducting material that has an electrochemical stability window against lithium of at least 2.2 V, a lowest electrochemical stability being less than 2.0 V and a highest electrochemical stability being greater than 4.2 V, the ion-conducting material selected from the group consisting of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

8. The all-solid-state battery of claim 7, wherein the transition metal oxide active material comprises one or more of nickel, cobalt and manganese.

9. The all-solid-state battery of claim 7, wherein the electrochemical stability window of the ion-conducting material is at least 2.8 V and the highest electrochemical stability is greater than 4.8 V, the ion-conducting material selected from the group consisting of: $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$; $Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $RbLi_2Be_2F_7$; and $RbLiF_2$.

10. The all-solid-state battery of claim 9, wherein the transition metal oxide active material comprises one or more of nickel, cobalt and manganese.

11. A cathode for a lithium battery, comprising:
active cathode material particles; and
a coating on the active cathode material particles, wherein the coating comprises an ion-conducting material, the ion-conducting material having an electrochemical stability window against lithium of at least 2.2 V, a lowest electrochemical stability being less than 2.0 V and a highest electrochemical stability being greater than 4.2 V, the ion-conducting material comprising one or more of: $Cs_2LiCl_3$; $Cs_2LiCrF_6$; $Cs_2LiDyCl_6$; $Cs_2LiErCl_6$; $Cs_2LiGdCl_6$; $Cs_2LiLuCl_6$; $Cs_2LiNdCl_6$; $Cs_2LiPrCl_6$; $Cs_2LiScCl_6$; $Cs_2LiSmCl_6$; $Cs_2LiTbCl_6$; $Cs_2LiTmCl_6$; $Cs_2LiYCl_6$; $Cs_3Li_2Cl_5$; $Cs_3LiCl_4$; $CsLi_2Cl_3$; $CsLi_3Cl_4$; $CsLiBeF_4$; $CsLiCl_2$; $K_{10}LiZr_6H_4O_2F_{35}$; $K_2LiCeCl_6$; $K_2LiDyCl_6$; $K_2LiGdCl_6$; $K_2LiLaCl_6$; $K_2LiPrCl_6$; $K_2LiTbCl_6$; $KLiDyF_5$; $KLiErF_5$; $KLiGdF_5$; $KLiHoF_5$; $KLiLuF_5$; $KLiPH_2O_4F$; $KLiTbF_5$; $KLiTmF_5$; $KLiYF_5$; $Li_{10}Mg_7Cl_{24}$; $Li_2B_3O_4F_3$; $Li_2B_6O_9F_2$; $Li_2BeCl_4$; $Li_2BF_5$; $Li_2CaHfF_8$; $Li_2MgCl_4$; $Li_2SiF_6$; $Li_2Ta_2(OF_2)_3$; $Li_2ZnCl_4$; $Li_2ZrF_6$; $Li_3AlF_6$; $Li_3ErCl_6$; $Li_3ScCl_6$; $Li_3ScF_6$; $Li_3ThF_7$; $Li_3YF_6$; $Li_4Be_3P_3BrO_{12}$; $Li_4Be_3P_3ClO_{12}$; $Li_4ZrF_8$; $Li_6ZrBeF_{12}$; $Li_9Mg_3P_4O_{16}F_3$; $LiAlCl_4$; $LiB_6O_9F$; $LiBF_4$; $LiGdCl_4$; $LiLuF_4$; $LiScF_4$; $LiTaF_6$; $LiThF_5$; $LiYF_4$; $LiZr_5T_1F_{22}$; $Na_3Li_3Al_2F_{12}$; $NaLi_2AlF_6$; $NaLiBeF_4$; $NaLiMgPO_4F$; $Rb_2LiCeCl_6$; $Rb_2LiDyCl_6$; $Rb_2LiErCl_6$; $Rb_2LiGdCl_6$; $Rb_2LiLaCl_6$; $Rb_2LiLuCl_6$; $Rb_2LiPrCl_6$; $Rb_2LiScCl_6$; $Rb_2LiTbCl_6$; $Rb_2LiYCl_6$; $RbLi_2Be_2F_7$; $RbLiCl_2$; and $RbLiF_2$.

12. The cathode for the lithium battery of claim 11, wherein the active cathode material particles comprise a transition metal oxide.

13. The cathode for the lithium battery of claim 12, wherein the transition metal oxide comprises one or more of nickel, cobalt and manganese.

14. The cathode for the lithium battery of claim 11, wherein the electrochemical stability window against lithium of the ion-conducting material is at least 2.8 V and the highest electrochemical stability is greater than 4.8 V, the ion-conducting material comprising one or more of $Cs_2LiCrF_6$; $Cs_2LiLuCl_6$; $CsLiBeF_4$; $KLiDyF_5$; $KLiErF_5$; $KLiGdF_5$; $KLiHoF_5$; $KLiLuF_5$; $KLiTbF_5$; $KLiTmF_5$; $KLiYF_5$; $Li_2BF_5$; $Li_2CaHfF_8$; $Li_2SiF_6$; $Li_2ZrF_6$; $Li_2Ta_2(OF_2)_3$; $Li_3AlF_6$; $Li_3ScF_6$; $Li_3YF_6$; $Li_3ThF_7$; $Li_4ZrF_8$; $Li_6ZrBeF_{12}$; $LiB_6O_9F$; $LiBF_4$; $LiLuF_4$; $LiScF_4$; $LiYF_4$; $LiThF_5$; $LiTaF_6$; $LiZr_5TlF_{22}$; $Na_3Li_3Al_2F_{12}$; $NaLi_2AlF_6$; $NaLiBeF_4$; $RbLi_2Be2F_7$; and $RbLiF_2$.

15. The cathode for the lithium battery of claim 14, wherein the active cathode material particles comprise a transition metal oxide.

16. The cathode for the lithium battery of claim 15, wherein the transition metal oxide comprises one or more of nickel, cobalt and manganese.

\* \* \* \* \*